United States Patent [19]

Holbrook et al.

[11] Patent Number: 4,553,445
[45] Date of Patent: Nov. 19, 1985

[54] INTERMITTENT MOVEMENT-CONTROLLING INDEXING SHUTTLE DEVICE

[76] Inventors: Joe C. Holbrook, R.R. 2, Box 167, Clayton, Ind. 46118; Bobby L. Shepard, R.R., North Vernon, Ind. 47265

[21] Appl. No.: 585,452

[22] Filed: Mar. 20, 1984

[51] Int. Cl.⁴ .................. F16H 27/02; B26D 5/22; B65H 35/04
[52] U.S. Cl. .................... 74/130; 83/227; 83/229; 226/141; 226/156; 74/422
[58] Field of Search ............ 74/130, 411, 422; 83/225, 226, 227, 228, 229; 226/141, 156, 157

[56] References Cited

U.S. PATENT DOCUMENTS

| | | | |
|---|---|---|---|
| 859,220 | 7/1907 | Healy | 83/226 |
| 1,318,487 | 10/1919 | Donaldson | 83/229 |
| 1,626,444 | 4/1927 | Barnes | 226/141 |
| 2,392,138 | 1/1946 | Freeman | 83/229 |
| 3,013,708 | 12/1961 | Adams | 226/156 |
| 3,076,367 | 2/1963 | Leibinger et al. | 83/229 |
| 3,076,368 | 2/1963 | Groll | 226/156 |
| 3,078,734 | 2/1963 | Wiig | 74/130 |
| 3,371,834 | 3/1968 | Willits et al. | 226/141 |
| 3,597,959 | 8/1971 | Leis | 226/141 |

FOREIGN PATENT DOCUMENTS 528029  7/1956  Canada .................. 226/156

Primary Examiner—Alan Cohan
Assistant Examiner—John A. Rivell
Attorney, Agent, or Firm—Robert A. Spray

[57] ABSTRACT

An indexing shuttle mechanism, for imparting intermittent motion or work-feeding to an associated machine, adjustable to provide selected variation of the length and timing of the output stroke of the mechanism with respect to the cycle of the associated machine's reciprocating component upon which the shuttle mechanism is mounted.

11 Claims, 8 Drawing Figures

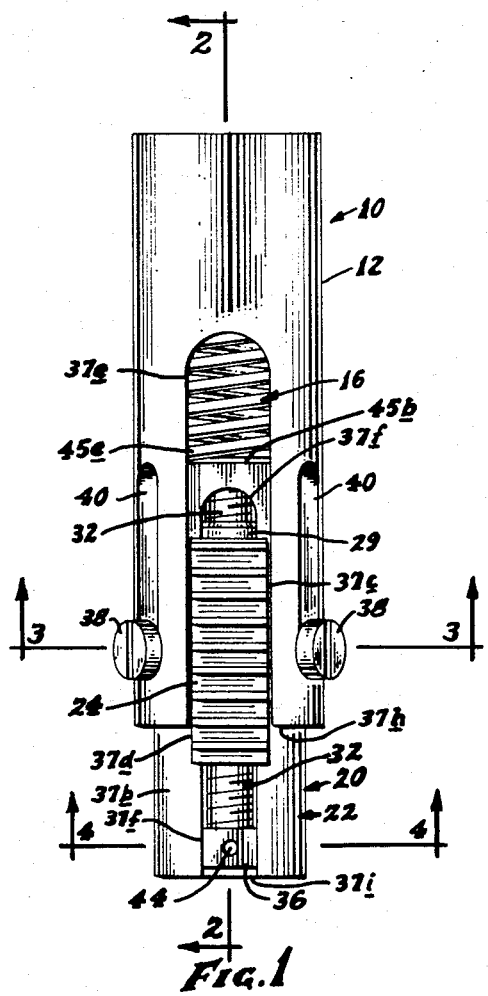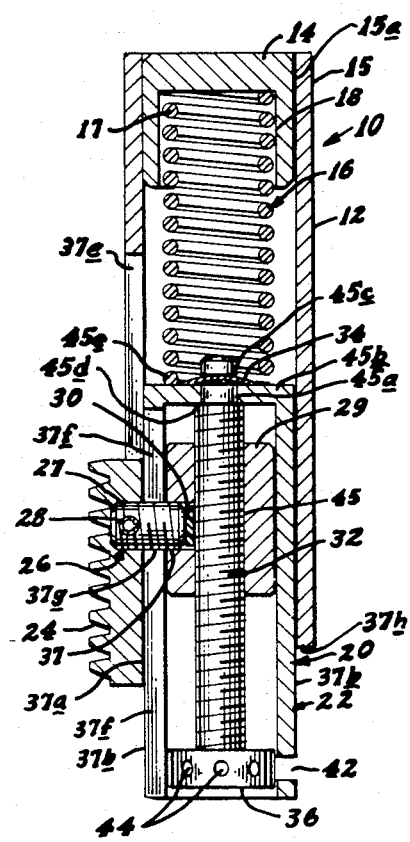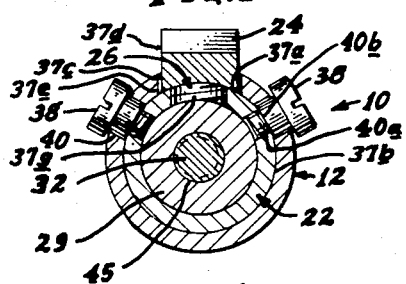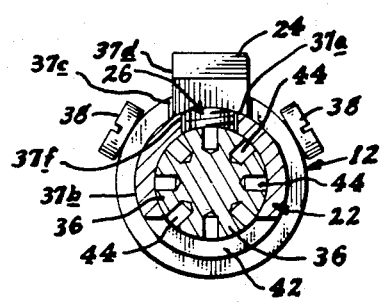

INTERMITTENT MOVEMENT-CONTROLLING INDEXING SHUTTLE DEVICE

The present invention relates to an indexing mechanism for imparting intermittent motion or work-feeding to an associated machine.

More particularly, the inventive concepts relate to and provide a shuttle device, adjustable in nature, by which power and the working stroke of the associated machine may be utilized to provide a cyclical energization of the shuttle device, to achieve a controlled output drive which is intermittent in nature, and cyclically co-ordinated with the associated mechanism's power stroke yet different from it.

That is, the movement difference, even though cyclically co-ordinated, may be illustrated as here shown in the illustrative embodiment of providing a controlled intermittent feeding of a work-strip to a die; for in such embodiment, the work-feed movement is to be done during cycle-stages when the die is not performing its work on the work-strip, but, instead, is to be done during other stages of the power stroke of the associated machine.

The concepts further provide a shuttle-type indexing device delivering as a work-output an intermittent drive whose length may be easily adjusted; and e.g., in the die mechanism use in the illustrative embodiment, the work-feed amount or distance, per power stroke cycle, and the timing of the work-feed stroke in relation to the cycle of the machine's power stroke, may be easily adjusted to give variations of work feed per cycle as would correspond to various lengths of individual output pieces having die-work performed thereon while still a part of the integral strip-stock being fed to the die mechanism.

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, for showing of the inventive concepts as well as illustrating the process and the use of the components of the device in providing the intermittent work-feeding for an associated die mechanism. In the drawings:

FIG. 1 is an elevation view of an adjustable feed indexing shuttle device according to an illustrative embodiment, the parts shown in a position of intermediate work-feed adjustment;

FIG. 2 is a vertical, longitudinal cross-sectional view thereof, generally as taken by section-line 2—2 of FIG. 1;

Figure 5:
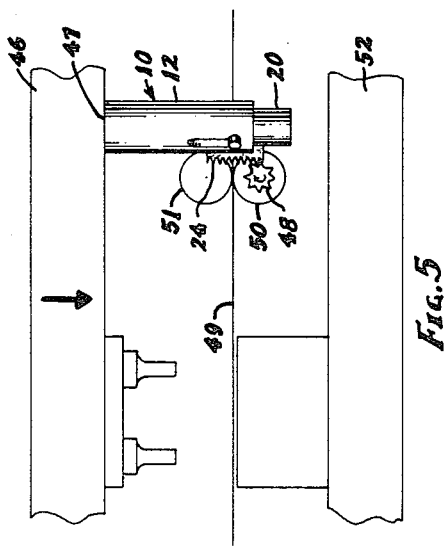
Figure 6:
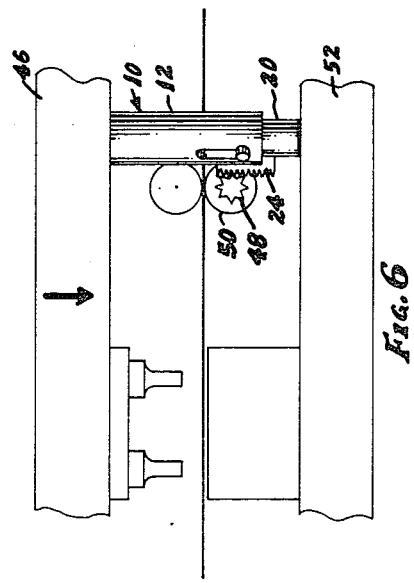
Figure 7:
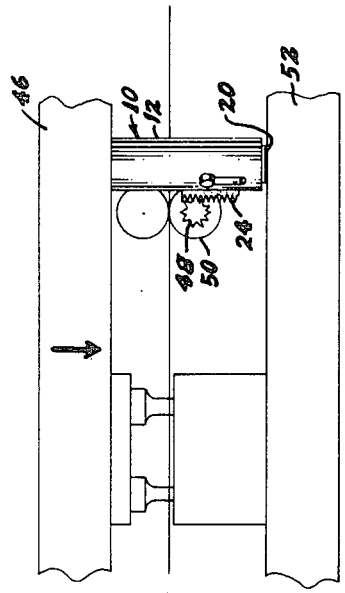
Figure 8:
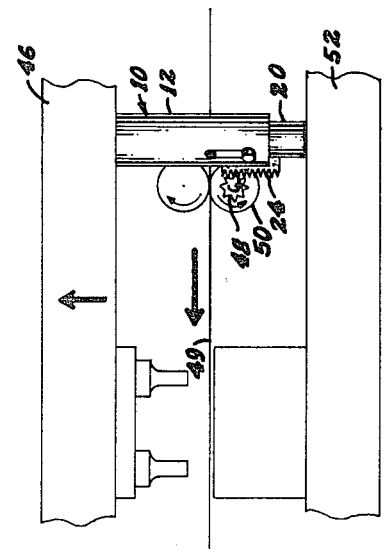

FIGS. 3 and 4 are transverse cross-sectional views thereof, generally as taken by section-lines 3—3 and 4—4, respectively, of FIG. 1;

FIGS. 5 through 8 are sequential views, illustrating the intermittent work-feed indexing operativity of the device of FIGS. 1-4 in association with an associated machine utilizing intermittent work-feed or indexing operativity, here shown as the device of FIGS. 1-4 installed on an associated die mechanism for performing work on sequential portions of an associated work-strip which is being caused to pass past the die in an intermittent manner; and in these sequential views, the work-object is always in a condition of dwell or rest except that in FIG. 8 the work-object is just going to begin one of its intermittent movements. In these sequential illustrations:

FIG. 5 illustrates an initial stage, at which the upper die shoe is beginning to descend in a work-stroke;

FIG. 6 illustrates a view of the parts in a subsequent portion of the upper die shoe's descent, with a shuttle assembly of the device having reached its lower limit of stroke;

FIG. 7 illustrates a view of the parts in a later stage, in which the shuttle assembly is remaining at its lowermost position as of FIG. 6, but with the top die shoe and a carrier tube of the shuttle device having moved farther downwardly than in FIG. 6 to the lower limit of the carrier tube's downward stroke; and FIG. 8 is a view of a still later stage, in which the die's top shoe and the device's carrier tube have already begun to move upwardly an amount such that the device's shuttle assembly is now also just beginning its upward stroke to impart a cycle of the intermittent work-feed to the associated work strip.

As shown in the drawings, the inventive concepts provide an intermittent movement control device 10, shown herein illustratively for the driving of a sheet metal stock feeding for indexing mechanism on a sheet metal die, or other machines requiring sequential movement or indexing of the feeding or other movement of a work-object, whether that intermittent movement be linear or rotational.

The device 10, particularly noting FIGS. 1-4, is shown as consisting of several co-operating components, as now described.

The most conspicuous component is its outer component, that being a hollow cylindrical shuttle carrier tube 12. The tube 12 has a downwardly-open cap or plug 14 which is fixedly attached to the inside of the shuttle carrier tube 12, at or adjacent its upper end 15, conveniently by a freeze fit at the cylindrical surface 15a between the plug 14 and the end 15 of the carrier tube 12. The plug 14 contains the upper end of a spring 16 whose upper end 17 is shown fitting in the hollow core 18 of the plug 14.

Another body provides an indexing shuttle assembly 20. As shown, the shuttle assembly 20 consists of several parts more fully described below, including a hollow cylindrical shuttle tube 22 which is freely slidable within the carrier tube 12, a rack gear 24, a holding screw 26 which is pressed into a hole 27 in rack gear 24 and locked into place therein by a roll pin 28 which pins the screw 26 to the rack 24, an adjusting nut 29 which is attached to rack gear 24 by screw 26 acting through a plastic insert 30, an adjusting screw 32 which is shown attached in a fixed linear position to the shuttle tube 22 by means of a spring retainer clip 34 adjacent the top of the adjustment screw 32, and a screw head 36 on the screw 32.

The holding or connector screw 26 is retained in a threaded hole 37 in the adjusting nut 29, and the plastic (resilient) insert 30 is located at the inner end of that hole 37, thereby holding the nut 29 and the rack 24 assembled.

The rack gear 24 has a circularly curved inner face 37a (FIG. 3), of the same radius of curvature of the outer face 37b of the shuttle tube 22, and the engagement of that curved rack-face 37a along the curved shuttle face 37b economically assures proper orientation of the rack 24 axially with the axis of the shuttle tube 22 and its carrier tube 12, even though the rack 24 and shuttle assembly 20 are connected only at one point, i.e., by the connector screw 26, and even though there is provided clearance 37c between the side faces 37d of the rack 24 and a longitudinally extending vertical slot 37e in the outer carrier tube 12 through which the rack 24 extends for work-feed indexing as specified below. (The work "curved" and the phrase "same radius of curvature" are used in the sense of a mating operativity which assures the proper orientation, rather than in a strict geometric sense.)

Another vertical slot 37f is provided, this in the shuttle tube 22, accommodating the mid-portion 37g of the connector screw 26 whose ends (which are respectively in the rack 24 and the nut 29) are on opposite sides of the wall of the shuttle tube 22; and both of the slots 37e and 37f extend fully to the bottom of the tubes 12 and 22, respectively, accommodating assembly, as shown respectively at 37h and 37i, and slots 37f and 37e are aligned.

The indexing shuttle assembly 20 is shown as held in the upper or outer shuttle carrier tube 12 by means of two lock screws 38; but the indexing shuttle assembly 20 is freely movable for sliding up and down inside the shuttle carrier tube 12, the lock screws 38 extending through slots 40 in the wall of carrier tube 12, as is shown in FIG. 1. (The abutment screws 38 are threaded into shuttle tube 22, in threaded holes 40a thereof, but pass freely through the wall-slots 40 in the shuttle's carrier tube 12, as shown in FIG. 3.)

It will be noted that the heads of screws 38 do not engage the outer shuttle carrier cylinder 12 even when the screws 38 are fully into the holes 40a, and that the end of the screws 38 do not bear against the adjustment nut 29. The fully-inserted position of the lock screws 38, as shown in FIG. 3, is when the shoulder 40b of the lock screws 38 bears against the outer surface 37b of the shuttle tube 22.

The telescoping relative movement of the shuttle assembly 20 with respect to the carrier tube 12 will be detailed in connection with the explanation of a typical or illustrative use of the device 10.

The position for the rack gear 24 may be adjusted, as now described, and for a purpose set forth below, up or down along the axis of the indexing shuttle assembly 20 by rotating the adjusting screw 32, that adjusting screw 32 being rotatable by inserting a tool or pin (not shown) through transverse slot 42 in the shuttle tube 22 and into one of the holes 44 in the adjusting screw head 36, and thereby rotating the adjusting screw head 36.

This adjustment rotation of screw 32, by its threaded engagement with the vertical hole 45 of nut 29, and with the screw 32 held against vertical movement as specified herein, causes the nut 29 to move vertically, and thus also causes the rack 24 connected to the nut 29 by screw 26 to likewise be moved vertically, with respect to the inner shuttle tube 22.

The plastic insert 30 in FIG. 2 provides some tension on the adjusting screw 32, prevents damage to its threads, and prevents the connector screw 26 from jamming so lightly against the adjustment screw 32 as would prevent the desired relative rotation of that screw 32 and the nut 29, even though for ease of manufacture the threaded lateral hole 37 in the nut 29 extends fully through the wall of nut 29 and opens to the vertical nut-hole 45.

It will be noted that the upper end of the adjustment screw 32 freely passes through a hole 45a in a transverse upper wall 45b at the upper end of the shuttle tube 22; and there is a circumferential groove 45c adjacent the end of the screw 32 which receives the clip 34, above the wall 45b, the clip 34 being desirably a commercially available bowed E-ring.

The upwardly-facing shoulder 45d near the end of the screw 32 bears against the lower surface of the transverse wall 45b, that engagement and the retainer 34 thus maintaining the vertical relation of the screw 32 and the shuttle tube 22, but permitting relative rotation thereof.

The spring 16 biases the shuttle assembly 20 downwardly, by the lower end 45e of the spring 16 bottoming against the transverse wall 45b of the shuttle tube 22. The parts and their dimensions are such that when the shuttle tubes 12 and 22 are in their fully extended position, with the screws 38 against the lower end of the slots 40, there is some compression in the spring 16, maintaining tightness of the overall assembly.

In use of the device 10, its carrier tube 12 is shown attached at 47 to the top shoe 46 (FIGS. 5-8) of the sheet metal die or other mechanism utilizing the intermittent feed indexing, with the rack gear 24 of the device 10 engaged in the associated machine's drive gear 48 of whatever is the feeding mechanism of the associated machine, as is shown in FIG. 5. (The associated machine is not a part of the invention, but is briefly described to show the operativity of the indexing shuttle device 10, and the operative connection of the device 10 to the associated mechanism, by which the shuttling of the device 10 is driven in correspondence with the associated mechanism's power strokes, and by which the shuttle assembly 20 delivers an intermittent stroke output which is different from the stroke-cycles of the associated machine's power strokes. Here the direction of work-feed of the strip of work 49 is intermittently leftwardly in the sequential views of FIGS. 5-8.)

As the top shoe 46 of the sheet metal die moves down, the engagement of the teeth of the rack 24 and the associated spur gear 48 causes the spur gear 48 to rotate clockwise. The spur gear 48, however, is connected to the machine's roller 50 by means of a unidirectional clutch such as a ratchet thus having an operativity of driving the roller 50 only when the spur gear 48 is being driven counterclockwise, feeding the work 49, although the drive roller 50 and the work strip 49 are in a dwell or rest condition at all other times. As the rack gear 24 moves downwardly in this FIG. 5 stage, causing the spur gear 48 to revolve clockwise, the ratchet-type interconnection of the spur gear 48 and drive roller 50 thus causes the drive roller to remain stationary.

The other roller 51 shown is an idler roller, so whatever is the intermittent work-feed operativity is a result of the intermittent drive achieved by the shuttle device, operative through rack 24 and the drive gear 48 ratchet-connected to the associated machine's drive roller 50; and it is to be noted that the machine's rollers 50 and 51, and the machine's drive gear 48, are supported in fixed relation to the machine's lower die shoe 52 to which the machine's upper die shoe 46 is relatively movable in whatever is the work operativity of the associated machine.

The top die shoe 46 (FIG. 6) continues to move down until the index shuttle assembly 20 of the device 10 contacts the bottom die shoe 52.

At this point, the rack gear 24 of the device 10 no longer moves downwardly; and thus there is at this point no further movement of the spur gear 48, the ratchet, or the drive roller 50.

The top die shoe 46 continues to move downward to the bottom of its stroke, at which time the carrier tube 12 has been moved downwardly with respect to the shuttle assembly 20, and the index shuttle assembly 20 has been correspondingly forced into the carrier tube 12, against the force of spring 16 above the index shuttle assembly 20 in the carrier tube 12, as is shown in FIG. 7. Although there has thus been an upward movement of the shuttle assembly 20 and its rack gear 24, it has been upward only with respect to the carrier tube 12, not with respect to the bottom die shoe 52 or the machine's drive gear 48.

When the machine's top die shoe 46 is at the bottom of the stroke as shown in FIG. 7, the die has completed its task on the work 49 and is ready to start back upwardly. As the top die shoe 46 travels up, the compression in the spring 16 of the device 10 forces the index shuttle assembly 20 outwardly of the shuttle's carrier tube 12, and keeps it in contact with the bottom die shoe 52, as shown in FIG. 8, until screws 38 come in contact with the bottom end of slots 40 as in FIG. 1 position; and during this time there is no movement of the shuttle assembly 20 or its rack gear 24 relative to the machine's drive gear 48, and thus during the beginning of the upward stroke of the upper die shoe 46 there is still no drive of the machine's drive gear or the associated work object 49.

As the top die shoe 46 continues to move up (FIG. 8), the rack gear 24 now starts moving up with it, toward the beginning position shown in FIG. 5, causing the spur gear 48 to rotate counter-clockwise, which, in turn, causes the drive roller 50 also to rotate counter-clockwise with it, causing the sheet metal or other work-strip 49 to move forward (leftwardly in FIG. 8) into the die for the die's work-operativity upon the next section of the work-strip 49.

It is to be noted that the longer the rack gear 24 of the device 10 is in contact with the spur gear 48 during up-stroke of the top die shoe 46, the more distance the sheet stock 49 will be advanced into the associated die. This length and duration of engagement may be accurately controlled by moving the rack gear 24 up or down, relative to the tube 22 of the index shuttle assembly 20, by means of the adjusting screw 32, as is shown in FIG. 2, and as described above; and a relatively upward positioning or adjustment of the rack 24 with respect to the shuttle tube 22 causes a relatively great amount of feed of the work 49 each cycle whereas a relatively downward adjustment of the rack 24 with respect to the shuttle tube 22 causes only a relatively small amount of work-feed each cycle.

This effect is because in a relative downward positioning of the rack gear 24 as to the shuttle tube 22, the top die shoe 46 and its attached shuttle carrier 12 will have reached the upper end of their stroke by the time the above-described shuttle-operativity will have caused only a relatively fewer of the teeth of the rack gear 24 to have moved upwardly with respect to the machine's fixed-height components of drive gear 48 and bottom die shoe 52.

It is thus seen that a movement-controlling or indexing shuttle device, according to the inventive concepts herein set forth, provides a desired and advantageous improvement yielding the advantages of an adjustable-feed device for causing the desired intermittent motion or work-stock feeding for an associated machine or mechanism, particularly useful for such uses as for driving a strip of metal or plastic work-stock into a die, but also for other machines requiring sequential indexing of the work-feed or other movement, whether linear or rotational, which is different from that of the associated machine's work-stroke yet cyclically co-ordinated therewith.

Accordingly, it will thus be seen from the foregoing description of the invention according to this illustrative embodiment, considered with the accompanying drawings, that the present invention provides new and useful concepts of a novel and advantageous mechanism for providing intermittent feeding or movement for an associated machine, easily attached onto existing machines, and providing a novel means and process of accomplishing the sequential or intermittent movement, and yielding desired advantages and characteristics in use, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. For example, although the indexing shuttle or control device 10 is shown and described as having its carrier or holder tube 12 operatively connected to the associated mechanism, that connection (including in such word both the mounting and the drive movement for the shuttle device) is intended and used herein in the broad or operational sense, of connection whether directly to a moving power member of the associated machine (such as here the die's top shoe 46) or indirectly to the machine by some sort of connection to any reciprocating member having movement co-ordinated with that of the machine whose intermittent work-feed is to be controlled as an output of this device 10.

What is claimed is:

1. An intermittent movement-controlling indexing shuttle device, for causing an associated work object to move intermittently in response to shuttle reciprocation movement of an associated mechanism, the shuttle device comprising, in combination:

a carrier means adapted to be operatively connected to the associated mechanism, for achieving reciprocation movement cyclically in response to the cycles of shuttle movement of the associated mechanism;

a shuttle assembly carried by the carrier means by means permitting relative movement thereof;

the carrier means and the shuttle assembly being provided with co-operative abutment means which when in operatively abutting engagement limit relative movement of the shuttle assembly outwardly of the carrier means;

spring means operatively bottoming against the carrier means and the shuttle assembly, biasing the shuttle assembly outwardly of the carrier means; and a gear means carried by the shuttle assembly for drivingly engaging associated gearing of the drive means by which driving actuation is imparted to the work object;

the components providing that (a) in a first stage of actuation the carrier means and the shuttle assembly are in a relatively extended relative position, and while in such relative position are moved in a first direction by the associated mechanism, (b) in a second stage of actuation the shuttle assembly is caused to stop, but the carrier means is permitted to keep moving in the first direction, and thus the carrier means and the shuttle assembly are moved toward a relatively non-extended relative position against the bias of the said spring means, and causing the spring means to be compressed, and (c) in a third stage of actuation, the carrier means is moved in the opposite direction by the associated mechanism, but the compression in the spring means causes the shuttle assembly to not move correspondingly in said opposite direction for the portion of the carrier means' movement in said opposite direction and instead causes the shuttle assembly to move relatively to the carrier means and toward extended position, and to remain in its stopped condition of the second stage, maintaining a rest or dwell condition of the shuttle assembly's gear means and thus also of the associated gearing of the work object's drive means during that portion of the movement of the carrier means in said opposite direction, but in continued movement of the carrier means in said opposite direction the shuttle assembly and its gear means are also moved by their retention by the carrier means in said opposite direction, once relative outward movement of the shuttle assembly with respect to the carrier means has brought the outward-movement-limiting co-operative abutment means into operatively abutting engagement;

the device thereby imparting an intermittent power stroke output, from the shuttle assembly's gear means to the work object's drive means, by which intermittent power stroking is accomplished which is adjustably different, in stroke length and in the timing thereof from the intermittent shuttle movement of the associated mechanism although cyclically co-ordinated therewith.

2. The invention as set forth in claim 1, in a combination in which the shuttle assembly is telescopingly slidably received within the carrier means.

3. The invention as set forth in claim 1, in a combination in which the shuttle assembly includes adjustable means for moving its gear means parallel to the axis of movement of the shuttle assembly relative to the carrier means, thereby to adjust the actuation of the associated gearing of the drive means for the work object.

4. The invention as set forth in claim 3 in a combination in which the said adjustable means comprises a pair of screw thread members a first one of which is supported for relative rotational movement with respect to the shuttle assembly but axially fixed with respect thereto, and the second of which is supported for relative axial movement with respect to the shuttle assembly but rotationally fixed with respect thereto.

5. The invention as set forth in claim 4, in a combination in which the first of said screw thread members is a bolt means, and the second of the said screw thread members is a nut means.

6. The invention as set forth in claim 5, in a combination in which there are connection means which interconnect the nut means and the gear means of the shuttle assembly, the said connection means thus providing that the adjustment of the nut means with respect to the shuttle assembly provides an adjustment of the location of the shuttle assembly's gear means.

7. The invention as set forth in claim 6, in a combination in which the shuttle assembly comprises a hollow tubular body member having a longitudinal slot provided in a wall thereof, and the said connection means extends through the said slot.

8. The invention as set forth in claim 6, in a combination in which the connection means is a screw, the nut means being provided with a threaded hole extending through a wall thereof for receiving said screw, the hole in the nut means extending fully through the nut means wall from its side surface to its threaded bore, and a resilient body member being carried in the said hole between the inner end of the said hole and the adjacent end of said screw.

9. The invention as set forth in claim 7, in a combination in which the carrier means also comprises a hollow body, it also being provided with a slot, the slot in the carrier means and the slot in the shuttle assembly body member being aligned, and the shuttle assembly's gear means extends into the slot of the carrier means body member, the connection means, which interconnects the nut means and the gear means of the shuttle assembly, and the inner portion of the shuttle assembly's gear means, extending through said aligned slots.

10. The invention as set forth in claim 1, in a combination in which the carrier means is a hollow body member, and the shuttle assembly is carried within the carrier means body member, the carrier means body member being provided with a slot, and the shuttle assembly being provided with an abutment means extending into the slot, the portion of the carrier means body member at an end of the slot, and the said abutment means, providing the cooperative abutment means which provides the said limiting of the relative movement of the shuttle assembly outwardly of the carrier means.

11. The invention as set forth in claim 6, in a combination in which the carrier means comprises a hollow body member having a curved outer face at least along the region of the adjustable location of the shuttle assembly's gear means, and the inner face of the shuttle assembly's gear means also having a curved face, the engagement of the curved faces of the shuttle assembly's gear means and of the carrier means body member assuring proper orientation of the shuttle assembly's gear means with respect to the shuttle assembly and the axis of its movement even though the shuttle assembly's gear means is connected thereto by only a single connection means, that being the connection to the said nut means.

* * * * *

UNITED STATES PATENT AND TRADEMARK OFFICE
CERTIFICATE OF CORRECTION

PATENT NO. : 4,553,445
DATED : November 19, 1985
INVENTOR(S) : Joe C. Holbrook and Bobby L. Shepard It is certified that error appears in the above—identified patent and that said Letters Patent is hereby corrected as shown below:

Col 3, line 6: The word "work" should be : -- word --.

Signed and Sealed this

Eleventh Day of February 1986

[SEAL]

Attest:

DONALD J. QUIGG

Attesting Officer      Commissioner of Patents and Trademarks